United States Patent

Nakatsugawa et al.

Patent Number: 6,088,824
Date of Patent: Jul. 11, 2000

[54] TEST PATTERN GENERATING APPARATUS, COMMUNICATION DEVICE AND SIMULATOR

[75] Inventors: Yoshinori Nakatsugawa; Narihisa Ito; Hirokazu Tatara, all of Susono, Japan

[73] Assignee: Yazaki Corporation, Tokyo, Japan

[21] Appl. No.: 09/071,891

[22] Filed: May 5, 1998

[30] Foreign Application Priority Data

May 8, 1997 [JP] Japan ................................ 9-118312

[51] Int. Cl.[7] .................................................. G01R 31/28
[52] U.S. Cl. ............................................................ 714/744
[58] Field of Search ........................... 714/744, 738–743; 365/201; 324/73.1

[56] References Cited

U.S. PATENT DOCUMENTS

| | | | |
|---|---|---|---|
| 4,247,941 | 1/1981 | Raymond | 714/741 |
| 5,383,195 | 1/1995 | Spence et al. | 714/733 |
| 5,909,448 | 6/1999 | Takahashi | 714/718 |

FOREIGN PATENT DOCUMENTS 56-7551  1/1981  Japan.

*Primary Examiner*—Hoa T. Nguyen
*Attorney, Agent, or Firm*—Oblon, Spivak, McClelland, Maier & Neustadt, P.C.

[57] ABSTRACT

A test pattern generating apparatus generates a test pattern for evaluating whether or not source data and a bit synchronous clock signal SCK are transmitted normally through a bus connecting a plurality of terminal units for transmitting and receiving source data. A test pattern generating circuit 33 generates predetermined test pattern data which are predetermined as the test pattern, based on the bit synchronous clock signal and a frame synchronous clock signal LRCK and outputs the test pattern data, bit synchronous clock signal and frame synchronous clock signal to the bus.

8 Claims, 5 Drawing Sheets

TEST PATTERN GENERATING APPARATUS, COMMUNICATION DEVICE AND SIMULATOR

BACKGROUND OF THE INVENTION

1. Field of the Invention

The present invention relates to a test pattern generating apparatus for generating a test pattern for evaluating whether or not data and a synchronous clock signal are transmitted normally through a bus, a communication device having a test pattern generating apparatus, and a simulator.

2. Description of the Related Art

In the case where a communication system such as a local area network (hereinafter, referred to as LAN), which is arranged by connecting a plurality of terminal devices for transmitting and receiving source data with a bus, is evaluated, it is necessary to confirm whether or not source data and a waveform of a synchronous clock signal are transmitted normally through a bus.

An evaluation system for making an evaluation of the communication system is, as shown in FIG. 1, for example, composed of a simulator 51, a terminal unit 53 and an analyzer 55. In a communication system between the simulator 51 and terminal unit 53, as shown in FIG. 2, when a synchronous clock signal in the simulator 51 is changed from negative to positive (timing A), a control command is transmitted from the simulator 51 to the terminal unit 53.

Next, when the synchronous clock signal is changed from positive to negative (timing B), the simulator 51 receives a response command from the terminal unit 53 and displays the received response command on the analyzer 55. When such a process is repeated, the synchronization of the command level can be confirmed.

However, in the conventional evaluation system, only the synchronization of the command level was confirmed, and the synchronization of source data and bit synchronous clock signal was not confirmed. Moreover, even if the source data and bit synchronous clock signal were tried on a measuring apparatus, since the source data had no regularity, it was difficult to confirm the synchronization of the communication system from the source data and bit synchronous clock signal.

SUMMARY OF THE INVENTION

Therefore, it is an object of the present invention to provide a test pattern generating apparatus, communication device and simulator which are capable of confirming synchronization of source data and a bit synchronous clock signal and make it easy to confirm synchronization of a communication system.

The present invention has the following arrangement in order to solve the above problem. The invention provides a test pattern generating apparatus generating a test pattern for evaluating to whether or not the communication data and a bit synchronous clock signal are transmitted normally through the bus when a plurality of terminal units for transmitting and receiving communication data are connected to a bus, said apparatus comprising:

a test pattern generating section generating test pattern data which are predetermined as the test pattern based on the bit synchronous clock signal and a frame synchronous clock signal and outputting the test pattern data, bit synchronous clock signal and frame synchronous clock signal to the bus.

According to this invention, since the test pattern generating section generates the test pattern data which are predetermined as the test pattern based on the bit synchronous clock signal and frame synchronous clock signal and outputs the test pattern data, bit synchronous clock signal and frame synchronous clock signal to the bus, disguised data can be confirmed, and further the synchronization of the source data and bit synchronous clock signal can be confirmed and the synchronization of the communication system can be confirmed easily.

In a preferred embodiment, the test pattern data generated by said test pattern generating section may comprise a first test pattern data having a first period in the first half period of the frame synchronous clock signal and a second test pattern data having a second period which is different from the first period in the latter half period of the frame synchronous clock signal.

According to this embodiment, since the test patterns are varied per half period of the frame synchronous clock signal, disguised data can be confirmed easily.

From the other aspect of the present invention, there is provided a communication device confirming and evaluating as to whether or not the communication data and a bit synchronous clock signal are transmitted normally through the bus when a plurality of terminal units for transmitting and receiving communication data are connected to a bus, said device comprising:

a test pattern generating section generating test pattern data which are predetermined for the confirmation and evaluation based on the bit synchronous clock signal and a frame synchronous clock signal and outputting the test pattern data, bit synchronous clock signal and frame synchronous clock signal; and an input switching section outputting the received communication data and bit synchronous clock signal or the test pattern data generated by said test pattern generating section and bit synchronous clock signal and frame synchronous clock signal to the bus.

According to this invention, in a normal mode, the received source data and bit synchronous clock signal are outputted by the input switching section, and in a test mode, the test pattern data generated by the test pattern generating section, bit synchronous clock signal and frame synchronous clock signal are outputted by the input switching section.

In a preferred embodiment of this invention, the test pattern data generated by said test pattern generating section may comprise a first test pattern data having a first period in the first half period of the frame synchronous clock signal and a second test pattern data having a second period which is different from the first period in the latter half period of the frame synchronous clock signal.

From the other aspect of the present invention, there is provided a simulator confirming and evaluating as to whether or not the communication data and a bit synchronous clock signal are transmitted normally through the bus when a plurality of communication devices for transmitting and receiving communication data are connected to a bus, said simulator comprising:

a test pattern generating section generating test pattern data which are predetermined for the confirmation and evaluation based on the bit synchronous clock signal and a frame synchronous clock signal and outputting the test pattern data, bit synchronous clock signal and frame synchronous clock signal;

an input switching section outputting the received communication data and bit synchronous clock signal or the test pattern data generated by said test pattern generating section and one of bit synchronous clock signal and frame synchronous clock signal; and a command generating section generating a command including a transmission source address and a destination address and outputting the command to the bus.

According to this invention, in a normal mode, the received source data and bit synchronous clock signal are outputted by the input switching section, and in a test mode, the test pattern data generated by the test pattern generating section, bit synchronous clock signal and frame synchronous clock signal are outputted by the input switching section. Moreover, the command generating section generates the command including a transmission source address and destination address and adds the command to the source data or test pattern data so as to output them to the bus.

In a preferred embodiment of this invention, the test pattern data generated by said test pattern generating section may comprise a first test pattern data having a first period in the first half period of the frame synchronous clock signal and second test pattern data having a second period which is different from the first period in the latter half period of the frame synchronous clock signal.

In a preferred embodiment of this invention, the input switching section may outputs the test pattern data, bit synchronous clock signal and frame synchronous clock signal on a display section through the bus.

According to this invention, when the test pattern data, bit synchronous clock signal and frame synchronous clock signal from the input switching section are displayed on the display section, disguised data and synchronization can be confirmed.

DETAILED DESCRIPTION OF THE PREFERRED EMBODIMENTS

The embodiments of a test pattern generating apparatus, communication device and simulator of the present invention will be described in detail with reference to the accompanying drawings.

[First Embodiment]

Figure 1:
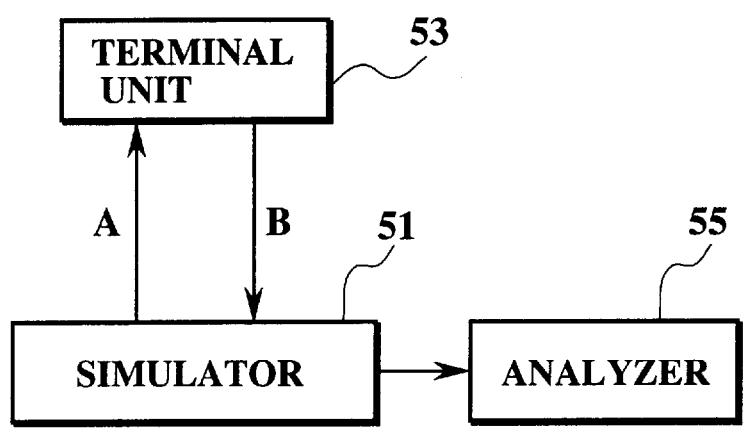
FIG. 1 is a drawing showing an example of connection between the simulator and terminal unit.
Figure 2:
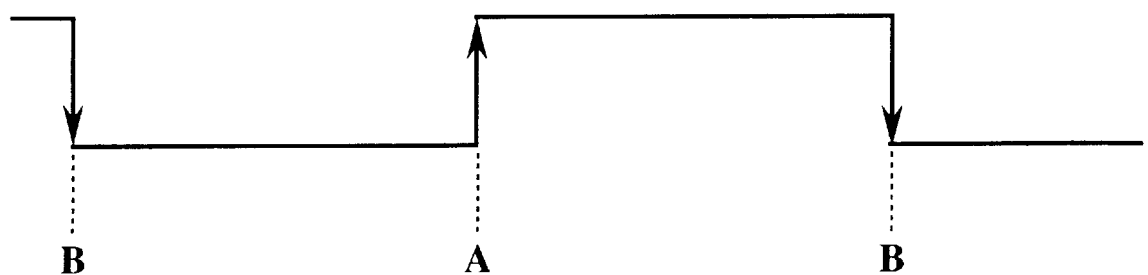
FIG. 2 is a timing chart of a synchronous clock signal for transmitting and responding a control command between the simulator and terminal unit.
Figure 3:
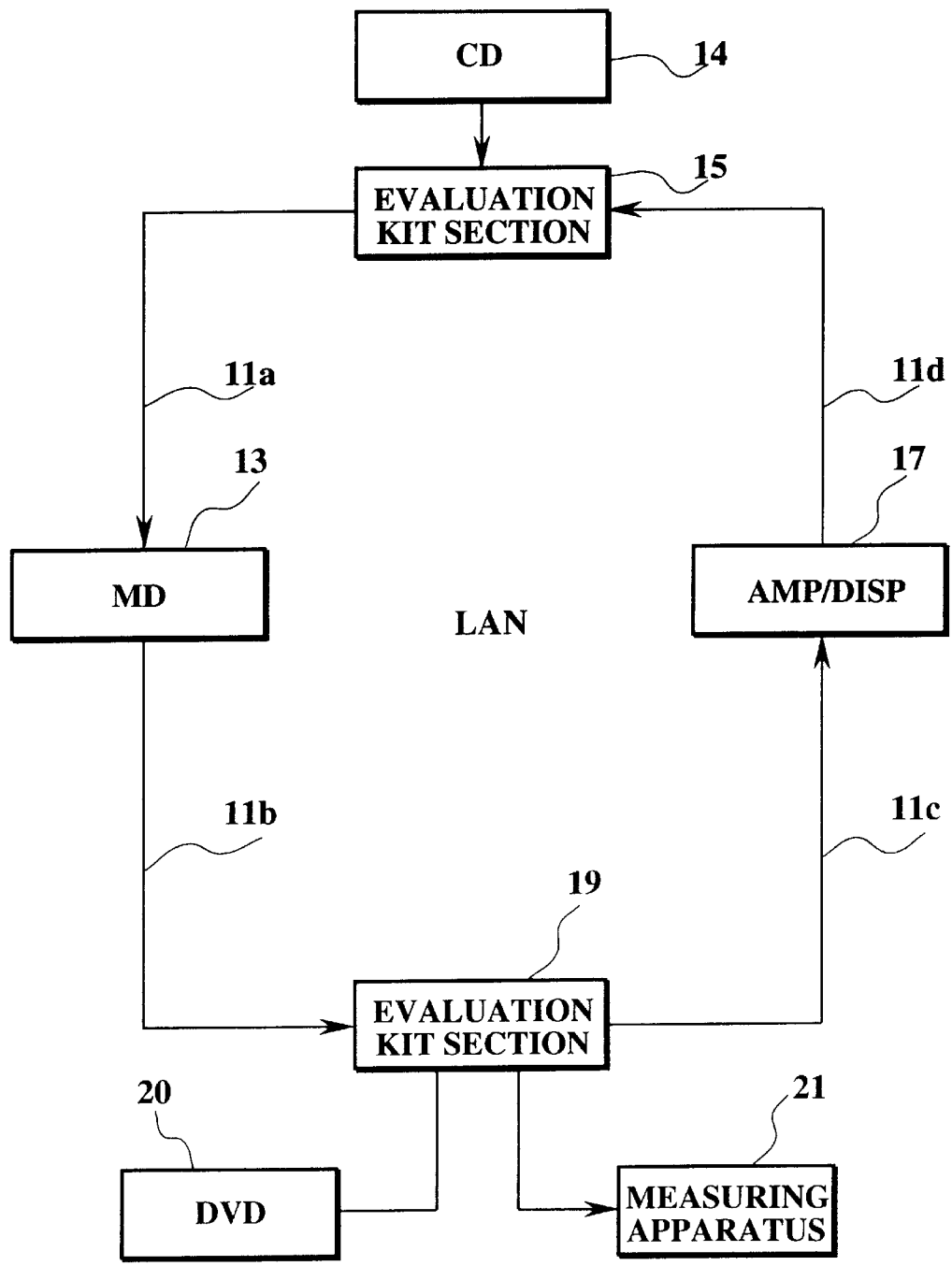
FIG. 3 is a drawing showing a communication system including a simulator according to a first embodiment of the present invention.

FIG. 3 shows a drawing of a communication system including the simulator according to a first embodiment. In FIG. 3, a compact disk (CD) 14 outputs digital audio data to an evaluation kit section 15, and the evaluation kit section 15 is connected with buses 11a and 11d. The bus 11a is connected with a mini disk (hereinafter, referred to as MD) 13, and the MD 13 is connected with an evaluation kit section 19 through a bus 11b.

The evaluation kit section 19 is connected with an amplifier/display (hereinafter, referred to as AMP/DISP) 17 through a bus 11c, and the AMP/DISP 17 is connected with the evaluation kit section 15 through the bus 11d. The evaluation kit section 19 is connected with a digital video disk (DVD) 20 and measuring apparatus 21.

The MD 13, evaluation kit section 19, AMP/DISP 17 and evaluation kit section 15 are connected in a closed loop form by the buses 11a through 11d so as to construct a local area network (hereinafter, referred to as LAN). For example, digital audio data from the CD 14 are transmitted to the evaluation kit section 15, MD 13, evaluation kit section 19 and AMP/DISP 17.

The digital audio data are composed of a plurality of frames, and the respective frames, in the case of two channels and stereo, are composed of two subframes, i.e., a subframe for L channel and a subframe for R channel. These two subframes are synchronized with a frame synchronous clock signal LRCK of frame unit so as to be transmitted. Data in the respective subframes are synchronized with a bit synchronous clock signal SCK of bit unit so as to be transmitted.

The evaluation kit sections 15 and 19 compose the communication device or simulator, and when an integrated circuit (hereinafter, referred to as IC) is designed, the evaluation kit sections 15 and 19 are evaluation boards for evaluating performance of the IC. The evaluation kit sections 15 and 19 monitor and output the synchronous clock signals SCK and LRCK and source data to the measuring apparatus 21 such as an analyzer so that synchronization of the bit synchronous clock signal SCK of bit unit and frame synchronous clock signal LRCK of frame unit and source data can be confirmed.

Figure 4:
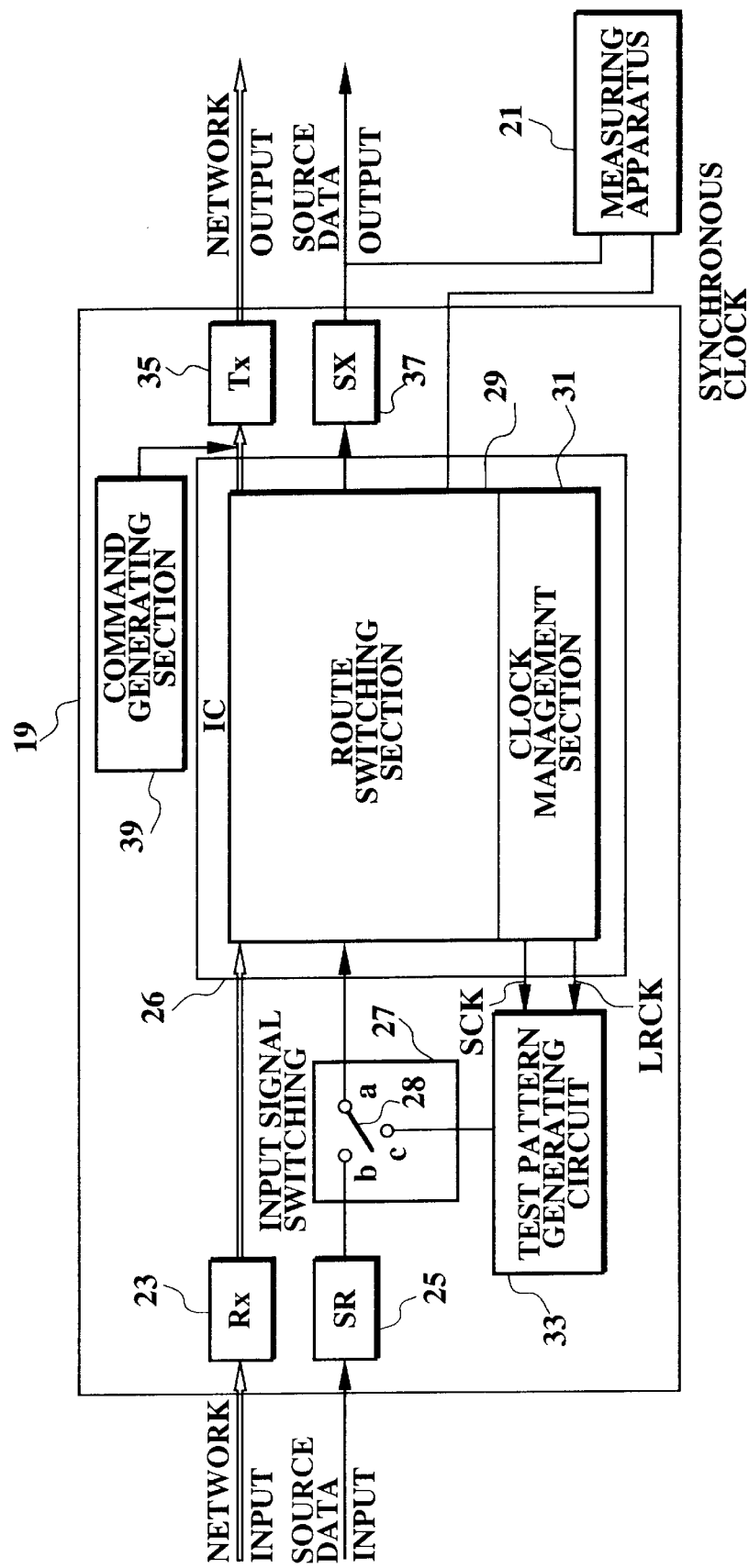
FIG. 4 is a block diagram of an evaluation kit section according to the first embodiment.

FIG. 4 shows a block diagram of the evaluation kit sections 15 and 19. In the evaluation kit section 19 shown in FIG. 4, a network signal receiving section (Rx) 23 receives a network signal from the bus 11b and outputs the network signal to a route switching section 29 in an IC 26. A source data receiving section (SR) 25 receives source data such as digital audio data from the DVD 20 and outputs the source data to a switching unit 27 as an input switching section. The IC 26 is composed of the route switching section 29 and a clock signal management section 31 as a clock signal generating section.

In the switching unit 27, a common terminal a is connected with one end of a contact piece 28, and the other end of the contact piece 28 is connected selectively with a selection terminal b or selection terminal c. The common terminal a is connected with the route switching section 25, and the selection terminal b is connected with an output terminal of the source data receiving section 29, and the selection terminal c is connected with a test pattern generating circuit 33.

The route switching section 29 switches routes. A command generating section 39 generates a command including a transmission source address and destination address adds the command to the source data so as to output the source data to which the command was added to a network signal transmitting section (Tx) 35.

The clock management section 31 generates a synchronous clock signal SCK of bit unit as well as a synchronous clock signal LRCK of frame unit and outputs the synchronous clock signals SCK and LRCK to the test pattern generating circuit 33 as a test pattern generating section as well as to the bus 11c through the network signal transmitting section (Tx) 35.

The test pattern generating circuit 33 generates test pattern data based on the synchronous clock signals SCK and LRCK from the clock management section 31, and the test pattern data are previously determined for confirming and evaluating as to whether or not source data and bit synchronous clock signal are transmitted normally through the buses.

The test pattern generating circuit 33 and clock management section 31 compose the test pattern generating apparatus, and generate a test pattern for evaluating as to whether or not the source data and bit synchronous clock signal SCK are transmitted normally through the buses 11a through 11d.

Figure 5:
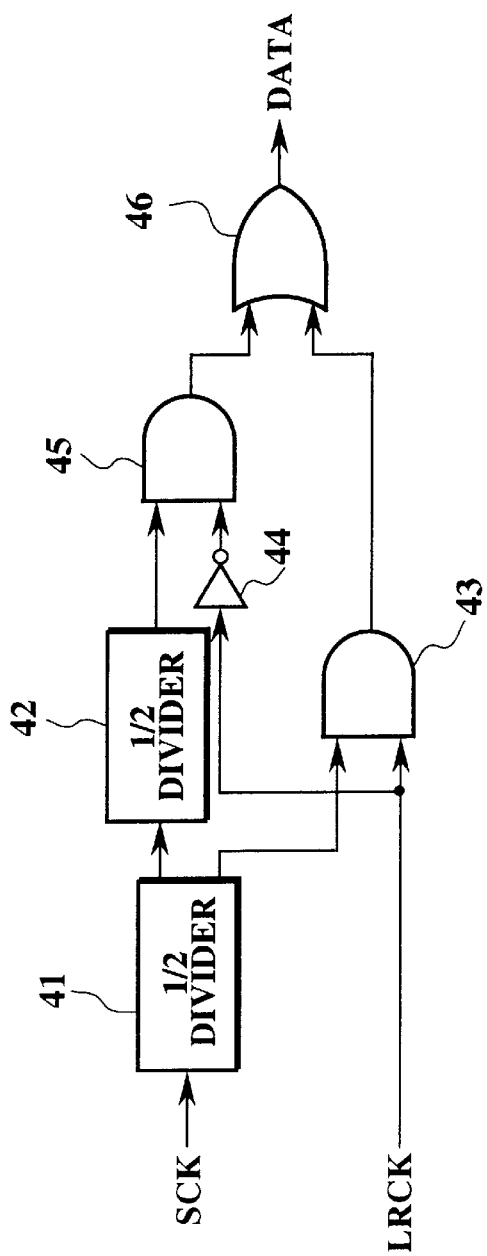
FIG. 5 is a detailed drawing of a test pattern generating circuit.

FIG. 5 shows a detailed drawing of the test pattern generating circuit 33. The test pattern generating circuit 33 is composed of a ½ divider 41 for dividing the bit synchronous clock signal SCK into ½, a ½ divider 42 for dividing an output of the ½ divider 41 into ½, an AND circuit 43 for obtaining the logical product of the output of the ½ divider 41 and the frame synchronous clock signal LRCK, a NOT circuit 44 for inverting the frame synchronous clock signal LRCK, an AND circuit 45 for obtaining the logical product of the output of the NOT circuit 44 and the output of the ½ divider 42, and an OR circuit 46 for obtaining the logical OR of the output of the AND circuit 45 and the output of the AND circuit 43.

Figure 6:
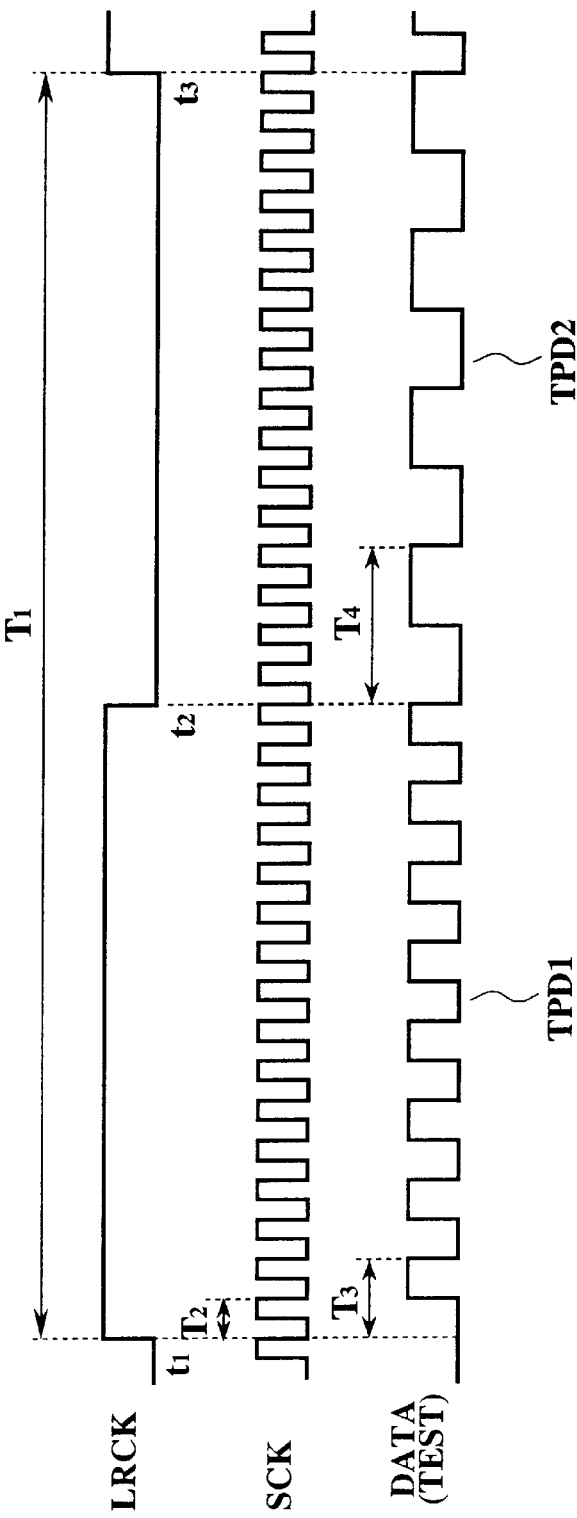
FIG. 6 is a drawing of a frame of a synchronous clock signal and test pattern data.

The predetermined test pattern data which are generated by the test pattern generating circuit 33, as shown in FIG. 6, are composed of first test pattern data TPD1 having a first period $T_3$ in the first half period $T_1/2$ of the frame synchronous clock signal LRCK and second test pattern data TPD2 having a second period $T_4$ which is different from the first period $T_3$ in the latter half period $T_1/2$ of the frame synchronous clock signal LRCK.

When selecting the selection terminal b, the switching unit 27 outputs source data from the source data receiving section (SR) 25 to the route switching section 29, and when selecting the selection terminal c, it outputs test pattern data from the test pattern generating circuit 33 to the route switching section 29.

In the case where a network signal from the network signal receiving section (Rx) 23 is a signal other than a signal for you, the network signal transmitting section (Tx) 35 directly outputs the network signal to the bus 11c. Further, the source data from the switching unit 27 or the test pattern data are also outputted to the bus 11c.

In the case where a network signal from the network signal receiving section (Rx) 23 is a signal for you, the source data transmitting section (SX) 37 is switched by the route switching section 29 so as to receive the network signal.

The measuring apparatus 21 is an analyzer or the like, and it measures the test pattern data outputted from the source data transmitting section (SX) 37 and the synchronous clock signals SCK and LRCK from the IC 26, and displays the measured test pattern data and synchronous clock signals SCK and LRCK thereon. Here, the arrangement of the evaluation kit section 15 is the same as that of the evaluation kit section 19.

The following describes an operation of the communication system including the simulator arranged in the above manner. Here, for example, evaluation is made as to the case where digital audio data as source data are outputted from the CD 14 to the AMP/DISP 17 and as to the confirmation of the operation of the MD 13 using the evaluation kit sections 15 and 19 and the measuring apparatus 21. In this case, the evaluation kit sections 15 and 19 and the AMP/DISP 17 should be normal.

First, the description is given as to the normal process, namely, output of the digital audio data from the CD 14 to the AMP/DISP 17. The digital audio data from the CD 14 and the synchronous clock signal are inputted to the evaluation kit section 15, and the evaluation kit section 15 transmits the digital audio data and synchronous clocks to the MD 13 through the network signal receiving section (Rx) 23, IC 26, network signal transmitting section (Tx) 35, bus 11a, etc.

The digital audio data and synchronous clock signal received by the MD 13 are transmitted to the evaluation kit section 19 through the bus 11b, and the digital audio data in the evaluation kit section 19 are transmitted to the AMP/DISP 17 through the network signal receiving section (Rx) 23, IC 26, network signal transmitting section (Tx) 35 and bus 11c. As a result, the digital audio data are amplified in the AMP/DISP 17.

Next, in the test mode of the MD 13 (confirmation of the synchronization of the synchronous clock and data), the contact piece 28 selects the selection terminal c in the switching unit 27 of the evaluation kit section 15. Then, the test pattern generating circuit 33 generates predetermined test pattern data which are previously determined based on the synchronous clock signals SCK and LRCK from the clock management section 31.

Here, the operation of the test pattern generating circuit 33 is described using FIG. 5. First, the first ½ period of LRCK is described. LRCK is "1". The ½ divider 41 divides the bit synchronous clock signal SCK into ½, and when the AND circuit 43 obtains the logical product of the output of the ½ divider 41 and the frame synchronous clock signal LRCK, its output is the same as the output of the ½ divider 41, and the output of the ½ divider 41 is inputted into the OR circuit 46.

Meanwhile, the ½ divider 42 divides the output of the ½ divider 41 into ½, and the NOT circuit 44 inverts the frame synchronous clock signal LRCK. Since the AND circuit 45 obtains the logical product of the output of the NOT circuit 44 and the output of the ½ divider 42, its output becomes "0". For this reason, the output of the OR circuit 46 becomes the output of the ½ divider 41 in the first ½ period of LRCK. In the similar manner, LRCK is "0" in the latter ½ period of LRCK, so the output of the OR circuit 46 becomes the output of the ½ divider 42.

Next, the test pattern data are transmitted to the network signal transmitting section (Tx) 35 through the switching unit 27 and route switching section 29. Moreover, the synchronous clock signals SCK and LRCK from the clock management section 31 are transmitted to the network signal transmitting section (Tx) 35 through the route switching section 29. Thereafter, the test pattern data and synchronous clock signals SCK and LRCK are transmitted to the evaluation kit section 19 through the bus 11a, MD 13 and bus 11b.

Meanwhile, in the evaluation kit section 19, the test pattern data and synchronous clock signals SCK and LRCK are received by the network signal receiving section (Rx) 23 and are inputted to the source data transmitting section (SX) 37 through the route switching section 29. The test pattern data and synchronous clock signals SCK and LRCK from the source data transmitting section (SX) 37 are transmitted to the measuring apparatus 21 so as to be displayed thereon.

FIG. 6 shows on example of the synchronous clock signals LRCK and SCK and test pattern data (DATA) displayed on the measuring apparatus 21. The period of the frame synchronous clock signal LRCK is $T_1$, and the period of the bit synchronous clock signal SCK is $T_2$. In FIG. 6, the bit synchronous clock signal SCK is displayed in 32 bits/frame. Namely, the bit synchronous clock signals SCK of 32 bits exists in one period $T_1$ of the frame synchronous clock signal LRCK.

In the first half period $T_1/2$ of the frame synchronous clock signal LRCK, the test pattern is first test pattern data TPD1 having a first period $T_3$, and in the latter half period $T_1/2$ of the frame synchronous clock signal LRCK, the test pattern is second test pattern data TPD2 having a period $T_4$ twice as much as the first period $T_3$. Since test pattern is changed per half period of the frame synchronous clock signal LRCK, L and R can be identified.

As mentioned above, in the case where the synchronous clock signals LRCK and SCK and test pattern data are displayed as shown in FIG. 6, the connection and operation of the MD 13 can be evaluated as normal.

In the case where the test pattern displayed on the measuring apparatus 21 becomes the second test pattern data TPD2 in the first half period $T_1/2$ of the frame synchronous clock signal LRCK, and the test pattern becomes the first test pattern data TPD1 in the latter half period $T_1/2$ of the frame synchronous clock signal LRCK, namely, in the case where L and R of the test pattern to be displayed are contrary to L and R of the predetermined test pattern, occurrence of disguised data can be confirmed. As a result, the connection and operation of the MD 13 can be evaluated as abnormal. As for the cause of this abnormality, for example, it is considered that routes of L and R of the MD 13 are reversed.

As mentioned above, since the test pattern generating circuit 33 generates test pattern data which are similar to the predetermined synchronous clock signal based on the synchronous clock signal and transmits the generated test pattern data instead of source data at the time of the confirmation of synchronization, disguised data can be confirmed.

In addition, since the evaluation kit sections 15 and 19 monitor and output the synchronous clock signals SCK and LRCK and source data to the measuring apparatus 21 such as an analyzer, the synchronization of the synchronous clock signals SCK and LRCK and digital audio data as source data can be confirmed easily.

In addition, it has been necessary for evaluating characteristics of the IC 26 to make wiring from the IC 26 and try the wiring on the analyzer, but according to the first embodiment, the wiring operation is eliminated, so the steps of the process can be reduced.

[Second Embodiment]

Figure 7:
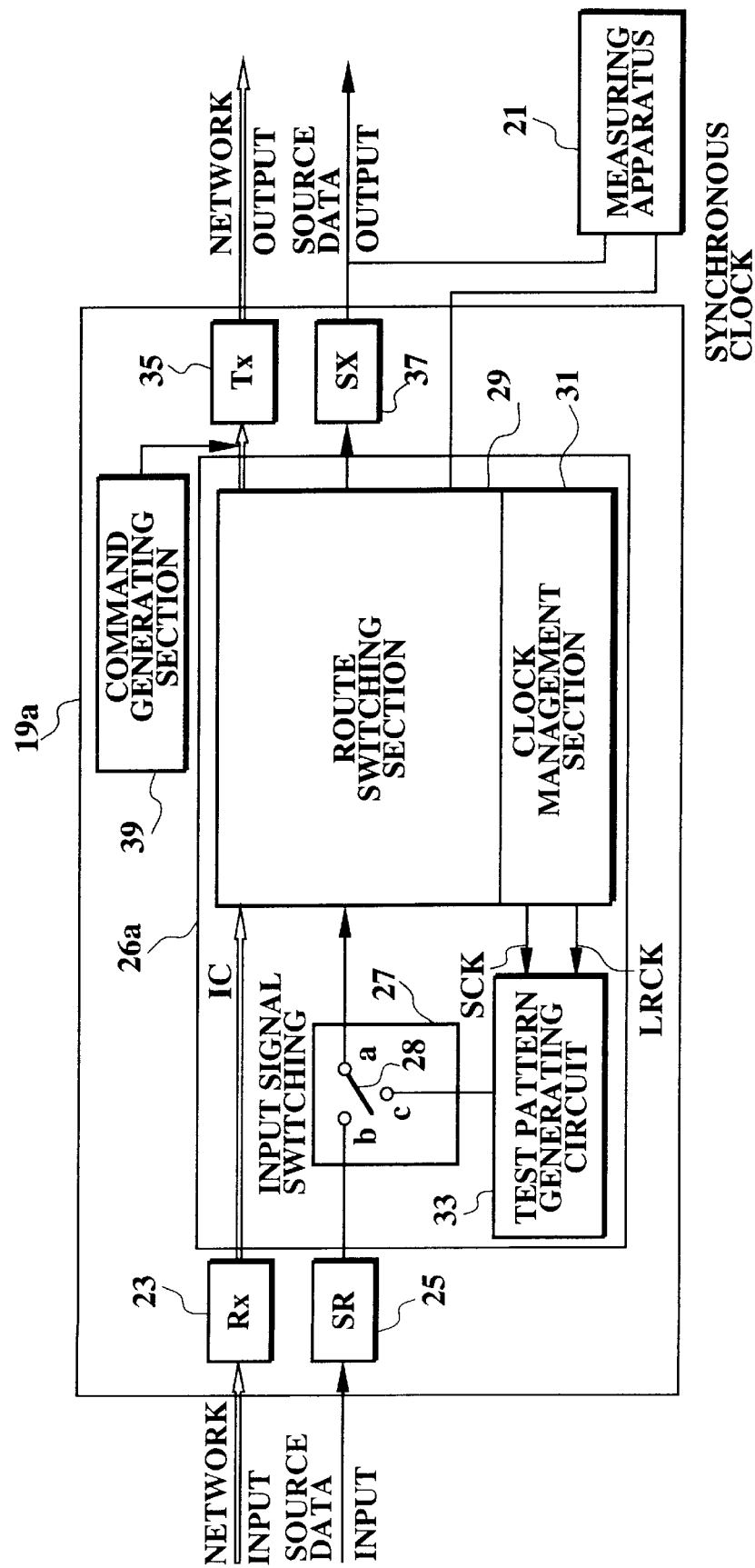
FIG. 7 is a block diagram of the evaluation kit section according to a second embodiment of the present invention.

The following describes the simulator according to a second embodiment of the present invention. FIG. 7 shows a block diagram of the evaluation kit section according to the second embodiment of the present invention. The arrangement of the communication system is substantially same as that of the first embodiment shown in FIG. 3, but the evaluation kit section 19 shown in FIG. 3 corresponds to an evaluation kit section 19a in FIG. 7, and the evaluation kit section 15 shown in FIG. 3 corresponds to an evaluation kit section 15a in FIG. 7. The arrangement of the evaluation kit section 15a is the same as that of the evaluation kit section 19a.

The evaluation kit section 19a shown in FIG. 7 is characterized by including the test pattern generating circuit 33 and switching unit 27 in an IC 26a. The evaluation kit section 19a is composed of the network signal receiving section (Rx) 23, source data receiving section (SR) 25, network signal transmitting section (Tx) 35, source data transmitting section (SX) 37, and the IC 26a which is connected to the above sections. The IC 26a is composed of the switching unit 27, test pattern generating circuit 33, route switching section 29 and clock management section 31.

Here, in the arrangement of the evaluation kit section of the second embodiment, the same parts as the evaluation kit sections of the first embodiment are represented by the same reference numerals, and the description thereof is omitted.

According to the second embodiment, digital audio data from the CD 14 are transmitted to the evaluation kit section 19a through the evaluation kit section 15a and MD 13, and the digital audio data in the evaluation kit section 19a are transmitted to the AMP/DISP 17 through the network signal receiving section (Rx) 23, IC 26, network signal transmitting section (Tx) 35 and bus 11c. As a result, the digital audio data are outputted to the AMP/DISP 17.

Next, in the case where synchronization of a synchronous clock signal and data is confirmed, the contact piece 28 selects the selection terminal c in the switching unit 27 in the IC 26a of the evaluation kit section 15a, and the test pattern generating circuit 33 in the IC 26a generates predetermined test pattern data shown in FIG. 4 based on synchronous clock signals SCK and LRCK from the clock management section 31.

The test pattern data and synchronous clock signals SCK and LRCK are transmitted to the MD 13 through the IC 26a, network signal transmitting section (Tx) 35, bus 11a, etc. and are sent to the evaluation kit section 19a through the MD 13.

Meanwhile, in the evaluation kit section 19a, the test pattern data and synchronous clock signals SCK and LRCK are received by the network signal receiving section (Rx) 23 and are inputted to the source data transmitting section (SX) 37 through the route switching section 29. The test pattern data and synchronous clock signals SCK and LRCK from the source data transmitting section (SX) 37 are transmitted to the measuring apparatus 21 so as to be displayed on the measuring apparatus 21.

In such a manner, when in the IC 26a the test pattern generating circuit 33 generates test pattern data and the switching unit 27 selects the selection terminal c in the IC 26a, similarly to the first embodiment, disguised data can be confirmed, and further the synchronization of the test pattern data and synchronous clock signals can be confirmed, so the synchronization of the communication system is confirmed easily.

Here, the present invention is not limited to the aforementioned embodiments 1 and 2. Embodiments 1 and 2 refer to digital audio data communication, but for example, in packet communication where packet data are transmitted and received in DVD 20, by adding header information including a transmission source address and destination address to the test pattern waveform, the present invention is applicable.

In addition, in embodiments, as for the confirmation of disguised data, the case where L and R of the test pattern to be displayed are contrary to the predetermined test pattern was exemplified, but for example, by applying the present invention, hard bug or soft bug such that a destination address is disguised can be also confirmed.

According to the present invention, since the test pattern generating section generates test pattern data, which are predetermined as a test pattern, based on a bit synchronous clock signal and a frame synchronous clock signal so as to output the test pattern data and bit synchronous clock signal and frame synchronous clock signal to the bus, disguised data can be confirmed, and further the synchronization of source data and bit synchronous clock signal can be confirmed, and the synchronization of the communication system can be confirmed easily.

In addition, when test patterns are varied per half period of the frame synchronous clock signal, disguised data can be confirmed easily.

Further, in the normal mode, received communication data and bit synchronous clock signal can be outputted by the input switching section, and in the test mode, test pattern data generated by the test pattern generating section, the bit synchronous clock signal and the frame synchronous clock signal can be outputted by the input switching section. Moreover, the command generating section can generate a command including a transmission source address and destination address and can output the command to the bus.

Furthermore, when the test pattern data, bit synchronous signal and frame synchronous clock from the input switching section are displayed on the display section, disguised data and synchronization can be confirmed.

What is claimed is:

1. A test pattern generating apparatus for generating a predetermined test pattern used to confirm whether or not communication data and a bit synchronous clock signal transmitted through a bus are synchronized, said apparatus comprising:

a clock management section configured to generate the bit synchronous clock signal and a frame synchronous clock signal and configured to output the bit synchronous clock signal and the frame synchronous clock signal to the bus;

a test pattern generating unit configured to receive the bit synchronous clock signal and the frame synchronous clock signal from the clock management section, configured to generate predetermined test pattern data based on the bit synchronous clock signal and a frame synchronous clock signal, and configured to output the predetermined test pattern data.

2. The test pattern generating apparatus according to claim 1, wherein the test pattern generating unit is configured to generate first test pattern data having a first period in the first half period of the frame synchronous clock signal and second test pattern data having a second period which is different from the first period in the second half period of the frame synchronous clock signal, said predetermined test pattern data including the first test pattern data and the second test pattern data.

3. A communication device for confirming whether communication data and a bit synchronous clock signal transmitted through a bus are synchronized, said device comprising:

a clock management section configured to generate the bit synchronous clock signal and a frame synchronous clock signal and configured to output the bit synchronous clock signal and the frame synchronous clock signal to the bus;

a test pattern generating section configured to receive the bit synchronous clock signal and the frame synchronous clock signal from the clock management section, configured to generate predetermined test pattern data based on the bit synchronous clock signal and the frame synchronous clock signal, and configured to output the predetermined test pattern data; and an input switching section configured to receive the communication data, the bit synchronous clock signal, the frame synchronous clock signal, and the predetermined test pattern data and configured to output the received communication data and bit synchronous clock signal or the predetermined test pattern data generated by said test pattern generating section, the bit synchronous clock signal, and the frame synchronous clock signal to the bus.

4. The communication device according to claim 3, wherein the predetermined test pattern data generated by said test pattern generating section comprises:

first test pattern data having a first period in the first half period of the frame synchronous clock signal and;

second test pattern data having a second period which is different from the first period in the second half period of the frame synchronous clock signal.

5. A simulator for confirming whether communication data and a bit synchronous clock signal transmitted through a bus are synchronized, said simulator comprising:

a clock management section configured to generate the bit synchronous clock signal and a frame synchronous clock signal and configured to output the bit synchronous clock signal and the frame synchronous clock signal to the bus;

a test pattern generating section configured to receive the bit synchronous clock signal and the frame synchronous clock signal from the clock management section, configured to generate predetermined test pattern data based on the bit synchronous clock signal and the frame synchronous clock signal, and configured to output the predetermined test pattern data;

an input switching section configured to receive the communication data, the bit synchronous clock signal, the frame synchronous clock signal, and the predetermined test pattern data and configured to output the received communication data and the bit synchronous clock signal or the predetermined test pattern data generated by said test pattern generating section and one of the bit synchronous clock signal and the frame synchronous clock signal; and a command generating section configured to generate a command including a transmission source address and a destination address and configured to output the command to the bus.

6. The simulator according to claim 5, wherein the predetermined test pattern data generated by said test pattern generating section comprises:

first test pattern data having a first period in the first half period of the frame synchronous clock signal;

second test pattern data having a second period which is different from the first period in the second half period of the frame synchronous clock signal.

7. The simulator according to claim 6, wherein said input switching section is configured to output the predetermined test pattern data, the bit synchronous clock signal, and the frame synchronous clock signal on a display section through the bus.

8. The simulator according to claim 5, wherein said input switching section is configured to output the predetermined test pattern data, the bit synchronous clock signal and the frame synchronous clock signal on a display section through the bus.

* * * * *